(12) United States Patent
Bejerano et al.

(10) Patent No.: US 8,254,347 B2
(45) Date of Patent: Aug. 28, 2012

(54) METHODS AND DEVICES FOR ASSOCIATING A MOBILE DEVICE TO ACCESS POINTS WITHIN A WLAN

(75) Inventors: Yigal Bejerano, Springfield, NJ (US); S. Jamaloddin Golestani, New Providence, NJ (US); Seung-Jae Han, Basking Ridge, NJ (US); Mark Anthony Shawn Smith, Jersey City, NJ (US)

(73) Assignee: Alcatel Lucent, Paris (FR)

( * ) Notice: Subject to any disclaimer, the term of this patent is extended or adjusted under 35 U.S.C. 154(b) by 1370 days.

(21) Appl. No.: 11/026,904

(22) Filed: Dec. 31, 2004

(65) Prior Publication Data

US 2006/0146768 A1 Jul. 6, 2006

(51) Int. Cl.
*H04W 4/00* (2009.01)

(52) U.S. Cl. ..... 370/338; 370/331; 370/332; 455/432.1; 455/435.1; 455/422.1

(58) Field of Classification Search ................. 370/338, 370/331, 332; 455/432.1, 435.1, 422.1
See application file for complete search history.

(56) References Cited

U.S. PATENT DOCUMENTS

| 6,587,680 | B1 | 7/2003 | Ala-Laurilla et al. ......... 455/411 |
| 7,558,208 | B2 | 7/2009 | Lin .............................. 370/238 |
| 7,756,520 | B2 | 7/2010 | Hashem et al. |
| 2002/0176445 | A1 | 11/2002 | Melpignano .................. 370/480 |
| 2003/0235164 | A1* | 12/2003 | Rogers et al. ................. 370/331 |
| 2004/0038682 | A1 | 2/2004 | Persson et al. ................ 455/436 |
| 2004/0102192 | A1* | 5/2004 | Serceki ......................... 455/434 |
| 2004/0198220 | A1* | 10/2004 | Whelan et al. ............... 455/41.1 |
| 2004/0223470 | A1* | 11/2004 | Smith ........................... 370/332 |
| 2005/0003827 | A1* | 1/2005 | Whelan ......................... 455/454 |
| 2005/0083923 | A1* | 4/2005 | Kimata et al. ................. 370/386 |
| 2005/0190701 | A1 | 9/2005 | Bejerano et al. ............. 370/252 |
| 2006/0146754 | A1 | 7/2006 | Bejerano et al. ............. 370/332 |
| 2006/0182023 | A1 | 8/2006 | Bejerano et al. ............. 370/229 |
| 2011/0314147 | A1* | 12/2011 | Whelan et al. ................ 709/224 |

FOREIGN PATENT DOCUMENTS

| EP | 1089494 A2 | 9/2000 |
| EP | 1089494 A3 | 9/2000 |
| JP | 2006-191579 | 7/2006 |

OTHER PUBLICATIONS

European Search Report dated Feb. 24, 2006.

* cited by examiner

*Primary Examiner* — Barry Taylor
(74) *Attorney, Agent, or Firm* — Capitol Patent & Trademark Law Firm, PLLC

(57) ABSTRACT

Unique identifiers are assigned to sets of adjacent access points in a wireless, local area network (WLAN). Thereafter, a unique identifier may be forwarded to a mobile device which uses the identifier to associate itself with one of the adjacent access points. Associating a mobile device with an adjacent access point using unique identifiers allows a WLAN to meet its load balancing objectives.

21 Claims, 1 Drawing Sheet

METHODS AND DEVICES FOR ASSOCIATING A MOBILE DEVICE TO ACCESS POINTS WITHIN A WLAN

BACKGROUND OF THE INVENTION

Traditionally, a mobile device (e.g., laptop computers, etc.) in a wireless, local area network (WLAN) can become associated with a number of access points ("APs") as the mobile device moves from one location to another. Generally, each of the APs are assigned the same identifier, known more formally as an Extended Service Set Identification (hereafter referred to as "identifier"). At any instant of time, the mobile device typically associates itself with the AP which provides it with transmissions at the highest signal-to-noise (SNR) level.

Sometimes, however, it may be necessary for a mobile device to associate itself with an AP based on other factors in addition to SNR. For example, it may be necessary to associate a mobile device with an AP that does not provide transmissions having high signal-to-noise ratios (SNR) in order to achieve overall load balancing goals for all APs within a WLAN. In such a case, a mobile device may be associated with an AP based on other factors in addition to SNR, such as the congestion levels at APs to meet overall load balancing goals of a WLAN.

When non-traditional associations are required, existing techniques for associating wireless devices to APs become inadequate.

Accordingly, it is desirable to provide for methods and devices which associate mobile devices to access points within a WLAN when other objectives and factors, in addition to SNR (e.g., load balancing), are considered.

SUMMARY OF THE INVENTION

We have recognized that mobile devices may be associated with access points within a WLAN to achieve overall load balancing goals of the WLAN by, for example, associating the mobile device with an adjacent access point that has been assigned a unique identifier.

More particularly, the present invention provides for a controller operable to first select at least one access point identifier from a plurality of identifiers, wherein each of the identifiers identifies one access point within a set (e.g., pair) of adjacent access points. The access points may be considered adjacent in order to achieve an overall load balancing goal of the WLAN.

After selecting the identifier, the controller may forward the identifier to a mobile device. Thereafter, the mobile device may use the identifier to associate itself with the access point which is uniquely identified by the forwarded identifier. By ensuring that a mobile device is associated with an adjacent access point, load balancing goals of the WLAN can be met.

A DESCRIPTION OF THE INVENTION INCLUDING EXAMPLES

Figure 1:
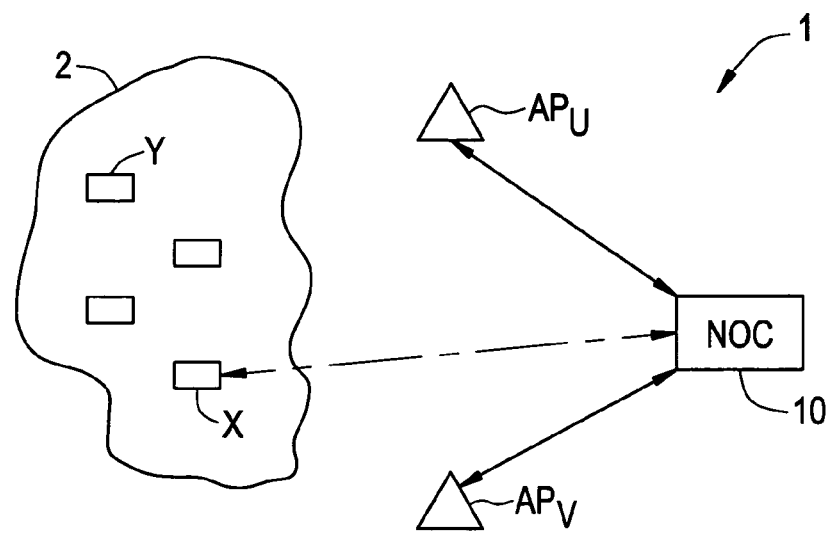
FIG. 1 depicts a simplified diagram of a WLAN, including wireless devices that are associated with APs according to embodiments of the present invention.

Referring now to FIG. 1, there is shown a WLAN 1 including a plurality of mobile devices 2, access points $AP_u$, $AP_v$ and controller 10. The controller 10 may be a part of a network operations center (NOC). In general, the mobile devices 2 and access points $AP_u$ and $AP_v$ may communicate with the controller 10 via wireless or wired transmissions.

At some point in time, a mobile device x is associated with access point $AP_u$ and it has been pre-determined that access points $AP_u$ and $AP_v$ are adjacent. That is, using the techniques disclosed in co-pending patent application Ser. No. 11/026,905 mentioned above it has previously been determined that access points $AP_u$ and $AP^v$ are connected by an "edge" in an access point adjacency graph (APAG).

Sometime thereafter, it becomes desirable to associate the mobile device x with another access point to achieve the load balancing goals of WLAN 1. In the explanation which follows, it will be assumed that it is desirable to change the access point association of mobile device x from $AP_u$ to $AP_v$ even though access point $AP_v$ may not be able to provide transmissions to mobile device x at a highest (or even high) SNR level.

In one embodiment of the present invention, mobile device x may become associated with access point $AP_v$ as follows.

Figure 2:
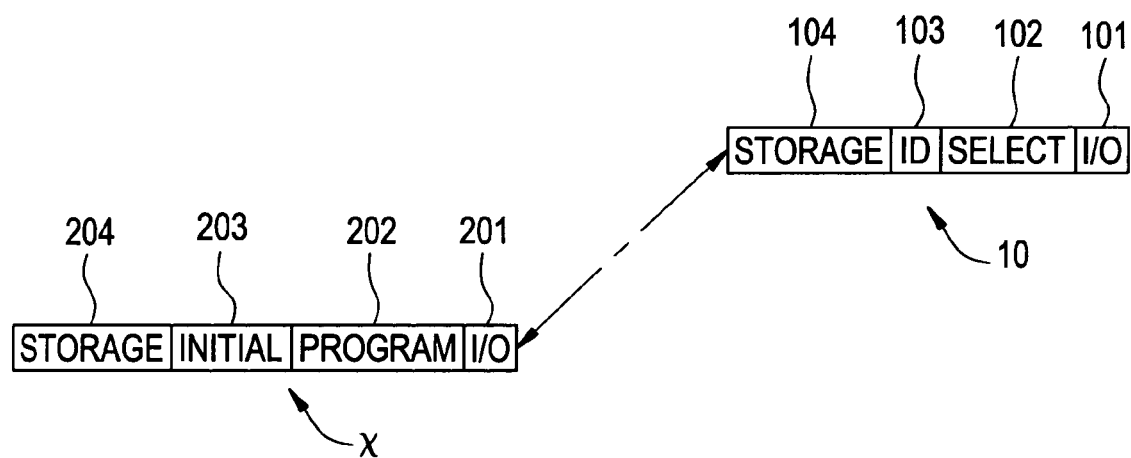
FIG. 2 depicts simplified block diagrams of a wireless device and controller according to an embodiment of the present invention.

Controller 10 may be operable to select at least one access point identifier from a plurality of identifiers that may, for example, be stored within a storage section 104 shown in FIG. 2. In accordance with the present invention, each of the identifiers uniquely identifies one AP, in this case either $AP_u$ or $AP_v$, which belongs to a set (e.g., pair) of adjacent APs. It should be understood that this differs from existing techniques which assign the same identifier to each AP. The selection of the identifier may be carried out using, for example, selection section 102.

After selecting the identifier (in this case the identifier associated with $AP_v$), the controller 10 may be further operable to forward the at least one identifier to the mobile device x using, for example, input/output ("I/O") section 101.

Upon receiving the identifier using, for example, I/O section 201, the mobile device x may, thereafter, be operable to associate with the access point, in this case $AP_v$, that is uniquely identified by the identifier. In one embodiment of the present invention, this association occurs during a so-called "run-time" period of the mobile device x. Though this association may not result in associating the mobile device x with an access point that can provide it with transmissions having a high SNR, this association may be the most desirable from an overall network load balancing standpoint.

Depending on the design selected for the mobile device x, or WLAN 1, it may, or may not, be necessary for the mobile device x to store the identifiers it receives. If it is, or becomes necessary, the present invention provides for such a circumstance. In a further embodiment of the present invention, the mobile device x may store one or more identifiers in, for example, a storage section 203 in case the mobile device needs to refer/retrieve the identifier for later use. For example, if for some reason communication with controller 10 becomes unavailable, it may be necessary for mobile device x to refer to its stored identifier(s).

Though it was mentioned above that the mobile device x could be a wireless laptop computer, it should be understood that mobile device x may comprise any one of a number of wireless devices such as a computer (laptop or other form), telephone, personal digital assistant, pager, digital music player (e.g., MP3 player) or another type of wireless device which may need to make use of an access point association.

Though the discussion so far has focused on the selection, forwarding, reception, etc. of one identifier, it should be understood that a plurality of identifiers may be selected, forwarded and received by the mobile device x. It should be understood, however, that each of the identifiers uniquely identifies one access point within a set of adjacent access points. It should be further understood that although only a single set of adjacent access points $AP_u$ and $AP_v$ are shown in FIG. 1, an identifier may be selected that uniquely identifies an access point that is contained within one of a plurality of sets of adjacent access points (not shown in FIG. 1).

To distinguish the set containing access points $AP_u$ and $AP_v$ from other sets, this set may be referred to as a "first" set.

Similarly, the controller 10 may forward one or more identifiers to other mobile devices than mobile device x (i.e., to a plurality of mobile devices). Each time, the goal is to associate each of the mobile devices with an access point within a set of adjacent access points using a unique identifier.

The discussion above may have raised an issue in the reader's mind concerning the number of identifiers needed to uniquely identify access points.

In yet a further embodiment of the present invention, identifiers may be re-used by each set (e.g., pair) of adjacent access points. For example, if 2 identifiers are used by adjacent access points $AP_u$ and $AP_v$ in the first set, those same identifiers can be used by another set of adjacent access points. Typically, this other set of adjacent access points will be located far away from mobile device x so there is little chance of confusion. Additionally, a re-used identifier will probably be forwarded on to another mobile device, for example, mobile device y, other than mobile device x.

Backtracking somewhat, there may be a number of ways to assign a unique identifier to each access point within a set of adjacent access points. In yet another embodiment of the present invention, the identifiers may be assigned as follows.

Controller 10 may be operable to identify, using an identification and assignment section 103, for example, one or more sets of adjacent access points from an access point adjacency graph (APAG) that may be stored in storage section 104 during a network configuration or initialization stage. After identifying each set (each pair) of adjacent access points, the controller 10 may be operable, again using section 103 for example, to assign a unique identifier to one and only one access point within each set of adjacent access points. In this manner each access point within a set of adjacent access points is assigned a unique identifier. In contrast, it should be noted that non-adjacent APs may be assigned the same identifier.

It should be understood that the functions and features of controller 10, mobile device x, and access points $AP_u$ and $AP_v$ may be carried out by software, firmware, hardware or some combination of the three. If software or firmware, one or more programmable memory devices may be used to store one or more programs which in turn may carry out the functions and features of the controller 10, mobile device x, and/or access points $AP_u$ and $AP_v$.

The discussion above has set forth a brief description and some examples of the present invention. It should be understood, however, that the true scope of the present invention is governed by the claims that follow.

We claim:

1. A method for associating a mobile device to an adjacent access point (AP) in a wireless, local area network (WLAN) comprising the steps of:
    configuring a first set of adjacent APs by assigning AP identifiers to the APs within the first set, wherein each AP in the first set has a signal quality indicator that exceeds a threshold that indicates the APs in the first set are adjacent, and wherein each AP identifier of the assigned AP identifiers identifies only a single one of the APs within the first set and is unique within the first set;
    selecting, within a controller in the WLAN, at least one AP identifier from the assigned AP identifiers that achieves load balancing goals of the WLAN;
    forwarding the at least one selected AP identifier from the controller to at least one mobile device to associate the at least one mobile device to an AP that is identified by the at least one selected AP identifier as achieving load balancing goals of the WLAN; and
    assigning additional AP identifiers to additional APs within at least one additional set of adjacent APs within the WLAN, wherein the additional AP identifiers include at least one of the AP identifiers assigned to the first set of adjacent APs.

2. The method as in claim 1 wherein the at least one selected AP is not an AP that provides a transmission to the mobile device with a highest signal-to-noise level.

3. The method as in claim 1 further comprising the step of:
    configuring the first set of adjacent APs by identifying the first set of adjacent APs from an adjacency graph.

4. The method as in claim 1 further comprising the step of:
    forwarding the at least one additional AP identifier to at least one additional mobile device to associate the at least one additional mobile device to one of the additional APs within the at least one additional set of adjacent APs.

5. The method as in claim 1 wherein the at least one selected AP identifier includes a plurality of AP identifiers.

6. A method for associating a mobile device to an access point (AP) in a wireless, local area network (WLAN) comprising the steps of:
    receiving, at the mobile device, at least one AP identifier from a controller within the WLAN, wherein the at least one received AP identifier is selected from AP identifiers assigned to APs within a first configured set of APs and identifies one AP within the first configured set that achieves load balancing goals of the WLAN, wherein each AP in the first configured set has a signal quality indicator that exceeds a threshold that indicates the APs in the first configured set are adjacent, and wherein each AP identifier of the AP identifiers assigned to the APs within the first configured set identifies only a single one of the APs within the first configured set and is unique within the first configured set; and
    associating the mobile device with the one AP identified by the at least one received AP identifier,
    wherein the one AP identified by the at least one received AP identifier is not necessarily an AP that can provide a transmission with a highest signal-to-noise level, and
    wherein additional AP identifiers are assigned to additional APs within at least one additional set of adjacent APs within the WLAN, wherein the additional AP identifiers include one or more of the AP identifiers assigned to the APs within the first configured set.

7. The method as in claim 6 further comprising the step of storing the at least one received AP identifier.

8. The method as in claim 6 wherein the at least one received AP identifier includes a plurality of AP identifiers each uniquely identifying one AP among the first configured set that achieves load balancing goals of the WLAN, and wherein the method further comprises the step of:
    storing the plurality of AP identifiers.

9. A controller, for associating a mobile device to an adjacent access point (AP) in a wireless, local area network (WLAN), operable to:
    configure a first set of adjacent APs by assigning AP identifiers to the APs within the first set, wherein each AP in the first set has a signal quality indicator that exceeds a threshold that indicates the APs in the first set are adjacent, and wherein each AP identifier of the assigned AP identifiers identifies only a single one of the APs within the first set and is unique within the first set;

select at least one unique AP identifier from the assigned AP identifiers that achieves load balancing goals of the WLAN;

forward the at least one selected AP identifier to at least one mobile device to associate the at least one mobile device with an AP that is identified by the at least one selected AP identifier as achieving load balancing goals of the WLAN; and assigning additional AP identifiers to additional APs within at least one additional set of adjacent APs within the WLAN, wherein the additional AP identifiers include at least one of the AP identifiers assigned to the first set of adjacent APs.

10. The controller as in claim 9 wherein the at least one selected AP is not an AP that provides a transmission to the mobile device with a highest signal-to-noise level.

11. The controller as in claim 9 further operable to:
configure the first set of adjacent APs by identifying the first set of adjacent APs from an adjacency graph.

12. The controller as in claim 9 further operable to:
forward the at least one additional AP identifier to at least one additional mobile device to associate the at least one additional mobile device to one of the additional APs within the at least one additional set of adjacent APs, achieving load balancing for the at least one additional set of adjacent APs within the WLAN.

13. The controller as in claim 9 wherein the at least one selected AP identifier includes a plurality of AP identifiers.

14. A wireless device operable to:
receive at least one access point (AP) identifier from a controller within a wireless, local area network (WLAN), the at least one received AP identifier being selected from AP identifiers assigned to APs within a first set of configured APs and identifying one AP among the first set that achieves load balancing goals of the WLAN, wherein each AP in the first set has a signal quality indicator that exceeds a threshold that indicates the APs in the first set are adjacent, and wherein each AP identifier of the AP identifiers assigned to the APs within the first set identifies only a single one of the APs within the first set and is unique within the first set; and associate with the one AP identified by the at least one received AP identifier, wherein the one AP identified by the at least one received AP identifier is not necessarily an AP that can provide a transmission with a highest signal-to-noise level, and wherein additional AP identifiers are assigned to additional APs within at least one additional set of adjacent APs within the WLAN, wherein the additional AP identifiers include one or more of the AP identifiers assigned to the APs within the first set.

15. The wireless device as in claim 14 further operable to store the at least one received AP identifier.

16. The wireless device as in claim 14 wherein the at least one received AP identifier includes a plurality of AP identifiers each uniquely identifying one AP among the first set that achieves load balancing goals of the WLAN, and wherein the device is further operable to:
store the plurality of AP identifiers.

17. The wireless device as in claim 14 wherein the wireless device comprises a computer.

18. The wireless device as in claim 14 wherein the wireless device comprises a telephone.

19. The wireless device as in claim 14 wherein the wireless device comprises a personal digital assistant.

20. The wireless device as in claim 14 wherein the wireless device comprises a pager.

21. The wireless device as in claim 14 wherein the wireless device comprises a digital music player.

* * * * *